US010579095B2

(12) United States Patent
Krumholz et al.

(10) Patent No.: US 10,579,095 B2
(45) Date of Patent: Mar. 3, 2020

(54) GOODS PROCESSING APPARATUS HAVING A PIVOTABLE DISPLAY

(71) Applicant: Francotyp-Postalia GmbH, Berlin (DE)

(72) Inventors: Wolf-Alexander Krumholz, Hennigsdorf (DE); Axel Ortmann, Berlin (DE); Wolfgang Muhl, Hohen Neuendorf (DE); Matthias Lorenzen, Berlin (DE)

(73) Assignee: Francotyp-Postalia GmbH, Berlin (DE)

( * ) Notice: Subject to any disclaimer, the term of this patent is extended or adjusted under 35 U.S.C. 154(b) by 0 days.

(21) Appl. No.: 16/402,680

(22) Filed: May 3, 2019

(65) Prior Publication Data

US 2019/0339735 A1     Nov. 7, 2019

(30) Foreign Application Priority Data

May 3, 2018    (DE) .................... 20 2018 102 463 U (51) Int. Cl.
| | |
|---|---|
| *H05K 5/00* | (2006.01) |
| *G06F 1/16* | (2006.01) |
| *G07B 17/00* | (2006.01) |
| *F16M 11/06* | (2006.01) |

(52) U.S. Cl.
CPC ........... *G06F 1/1601* (2013.01); *F16M 11/06* (2013.01); *G07B 17/00193* (2013.01); *G07B 2017/00282* (2013.01); *G07B 2017/00298* (2013.01)

(58) Field of Classification Search
CPC ...................................................... H05K 5/00
See application file for complete search history.

(56) References Cited

U.S. PATENT DOCUMENTS

| | | | |
|---|---|---|---|
| 5,818,020 A | 10/1998 | Kabacaoglu et al. | |
| 2013/0135416 A1* | 5/2013 | Muhl | B41J 15/04 347/105 |
| 2013/0335497 A1* | 12/2013 | Ortmann | G07B 17/00193 347/108 |

FOREIGN PATENT DOCUMENTS

| | | |
|---|---|---|
| DE | 202010000898 U1 | 4/2010 |
| EP | 718801 B1 | 4/1999 |

* cited by examiner

*Primary Examiner* — Jerry Wu (74) *Attorney, Agent, or Firm* — Schiff Hardin LLP (57) ABSTRACT

A goods processing apparatus can include a printing device, a pivotable display, a controller, and a sensor. The pivotable display may include a display support, a pivotable display holder, a display housing that houses a display monitor having a display border arranged around the display monitor and a display housing frame that surrounds the display border, and at least one actuation input device configured to manually trigger a motorized pivoting of the display monitor. The sensor detects an angle of inclination of the pivotable display. The controller controls a motor to automatically set a display inclination of the pivotable display based on the detected angle of inclination and a respective operator of the apparatus.

12 Claims, 8 Drawing Sheets

GOODS PROCESSING APPARATUS HAVING A PIVOTABLE DISPLAY

CROSS REFERENCE TO RELATED APPLICATIONS

This patent application claims priority to German Patent Application No. 20 2018 102 463.9, filed May 3, 2018, which is incorporated herein by reference in its entirety.

BACKGROUND

Field

The disclosure relates to a goods processing apparatus, including a goods processing apparatus having a pivotable display.

Related Art

EP 718 801 B1 describes a franking machine equipped with a large-area display, where the field division of the screen images is variable. As described in this document, the main menu is called via a menu button and the main menu presents a listing of base menus which are directly branched to via a user input. An additional hard key serves for the selection of the desired base menu, where the selection may either be confirmed using an Enter key or be modified using an additional button (hard key). The screen images of the individual base menus contain a subdivision into fields of variable size, where soft keys are associated with the fields so that the user may make an additional selection or parameter setting. The user interface as a whole is of very voluminous design.

A Sinclair ZX81 personal computer of the British manufacturer Sinclair Research Limited includes an arrangement of a film keyboard below the display.

A soft key thus resembles a button of a smartphone, with the difference that a real button outside of the screen is used. Given smartphones and similar communication devices, displays with a border and borderless displays (e.g. Samsung Galaxy Edge) are customary. Given the latter, additional input devices may only be accommodated at the housing edge of a communication device.

A Postbase-type franking machine may be equipped with a touchscreen as an input and output device. A touchscreen is a touch-sensitive display with which inputs are enabled by contact and output is enabled via display of a menu image and/or screen image.

German utility model DE 20 2010 000 898 U1 describes a mail processing device having a display. The display is accommodated in a display housing that can be manually adjusted, such that the viewing angle of the display is variable. The display housing has a window opening through which a touchscreen is visible and can be contacted in order to make inputs. The mail processing device has an actuation device for switching between locking capability and movement capability of the display housing; an unlockable or releasable arresting device; and an electromechanical or mechanical triggering device. The actuation device acts on the triggering device in order to unlock, loose, or release the arresting device so that the display housing is movable in the mail processing device. Upon actuation of the actuation device (e.g. pushbutton), a compression spring is compressed and the arresting device moves out of engagement with the display housing. As an alternative, a motorized adjustment of the inclination of the display was also proposed in the German utility model. A screw of a worm gear pair is driven by a motor, which is controlled by a controller via control lines. The controller is connected with a switch via electrical lines, wherein the switch is activated, for example via an actuation means (button), which the controller interprets accordingly. A firmly arrested display may not be exposed to too strong a pressure upon an input by a finger of the operator, since either the display housing would be moved and the worm gear pair would be damaged, or at least the inclination angle of the display would be unintentionally altered, which hinders its viewing. The display can disadvantageously only be pivoted in large steps. Given a release of the arresting device, an initial state of the inclination is set by elastic force, which initial state most often does not correspond to the desired inclination.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

In an exemplary embodiment, the goods processing apparatus includes an ink printing device configured to generate imprints on print media, a controller, and an input and output device. The ink printing device includes a printer, a transport device for print media, and a contact pressure device configured to press the print media against the transport device. In an exemplary embodiment, the goods processing apparatus is a smart franking machine and the input and output device is a pivotable display.

Print medium may include, for example, flat goods, mail pieces, letter envelopes, postcards, and one or more other print media as would be understood by one of ordinary skill in the art. The print medium is transported in the transport direction during printing.

An object of the present disclosure is to provide a goods processing apparatus whose display housing can be pivoted about a rotation axis, where the inclination angle of the display is controlled in a motorized manner by a controller and/or is manually adjustable. In exemplary aspects, the goods processing apparatus, such as a franking machine, is be capable of being individually adapted with smart features to the requirements of the customer. The franking machine should be equipped with suitable additional means, and its software should be further adapted with a program in order to improve the operation of the franking machine via a display. In an exemplary embodiment, the display includes a pivotable flat display screen as a user interface (e.g. an input/output display screen). In an exemplary embodiment, the user interface includes one or more additional input devices (e.g. buttons). In an exemplary embodiment, the display is configured for manual adjust and is configured so as to be protected against damage that might arise via a manual pivoting of the display given a large application of force. In an exemplary embodiment, the display is configured such that given an input by touching the touchscreen of the display, i.e. given a small application of force, the display's inclination remains unchanged.

In an exemplary embodiment, the goods processing apparatus includes an ink printing device (e.g. printer) configured to generate imprints (e.g. a print image) on print media; a controller; and an input and output device (e.g. display, such as a touchscreen display). In an exemplary embodiment, the display has a display support, a pivotable display holder, and a display housing. In this example, a display border is arranged around a display monitor/screen and a display housing frame surrounds the display border. In an exemplary embodiment, one or more actuation devices (e.g. input buttons) of the display are provided to manually trigger a motorized pivoting of the display. The additional actuation devices (e.g. buttons) may be arranged on the display border, for example.

In an exemplary embodiment, the controller includes a processor, a program memory, a working memory, an input/output circuit, and a non-volatile memory for storing setting data. In an exemplary embodiment, the program memory has a program for the automatic adjustment of a display inclination depending on a respective operator of the apparatus. In an exemplary embodiment, the controller includes processor circuity configured to perform one or more operations and/or functions of the controller, such as the automatic adjustment of a display inclination of the display.

In an exemplary embodiment, the display includes at least one sensor configured to detect the display inclination, such as the angle of inclination α. A horizontal H (FIG. 4) is situated orthogonal to a transport direction x of print media and thereby extends parallel to the y-direction.

Figure 4:
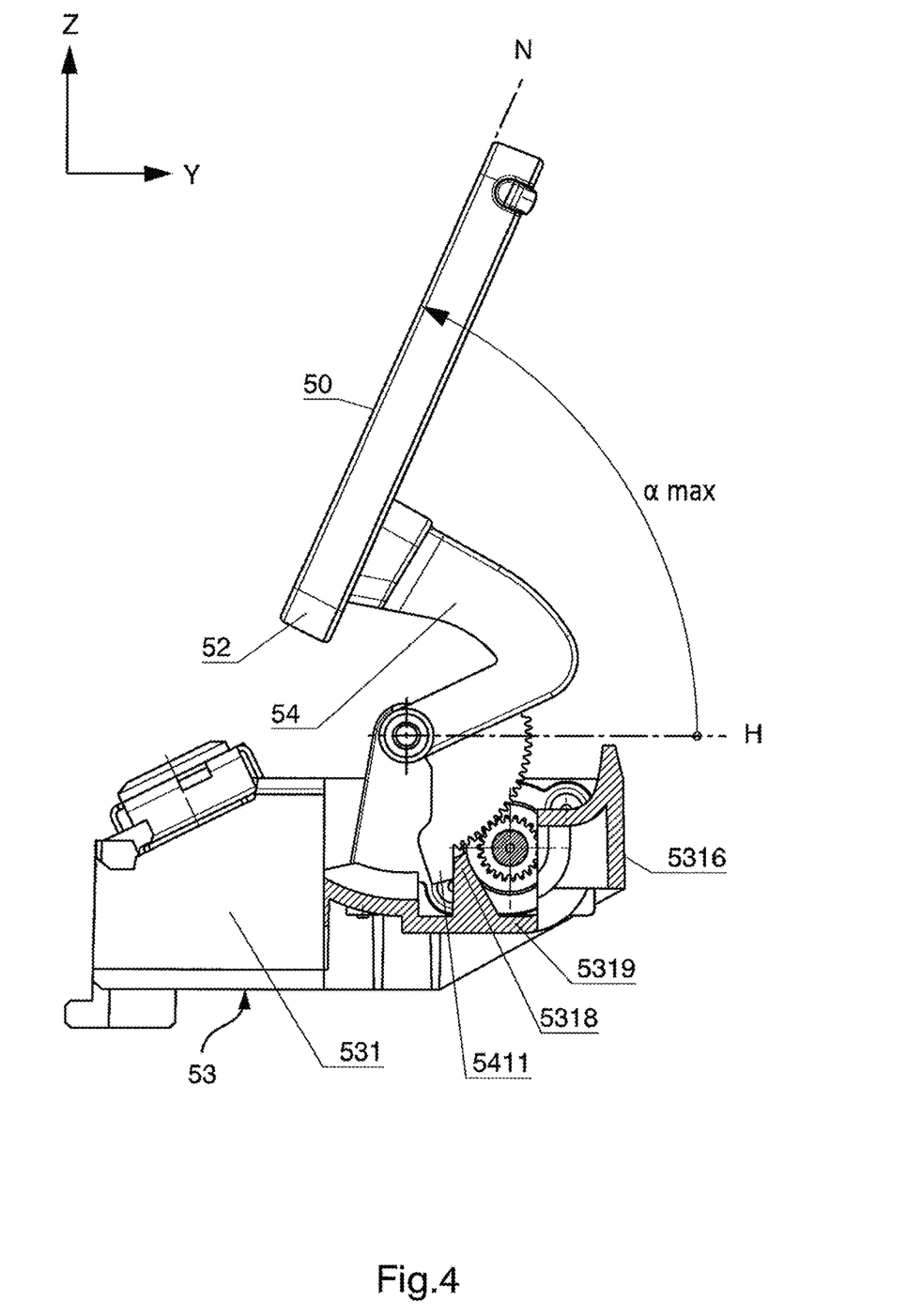
FIG. 4 is a side view of the sectioned display from the right, with a maximum angle of inclination of the display, according to an exemplary embodiment of the present disclosure.

As shown in FIG. 4, in an exemplary embodiment, the angle of inclination α is defined as the angle formed by an inclination line N situated on a surface of the display monitor relative to the horizontal H. That is, the angle of inclination α is the angle between line N and horizontal H. However, it should not therewith be precluded that the inclination of the display is alternatively defined in another variant of the disclosure.

In an exemplary embodiment, the sensor and a motor are electrically connected with the controller via the input/output circuit. Further, the display monitor is electrically connected with the controller. In an exemplary embodiment, the motor is equipped with a self-locking gearbox for the motorized pivoting of the display monitor, which gearbox reduces the revolutions of the motor and outputs via a gear shaft to an overload protection, wherein a pinion of the overload protection is provided that engages with a partial gearwheel segment of the pivotable display holder.

In an exemplary embodiment, an input device (e.g. buttons, keypad, etc.) is provided, and is configured for inputting manual input data, sensor data, identity features, or a personal identification number (PIN) of the operator of the goods processing apparatus. In an exemplary embodiment, the display screen is a component of the display, and is a touchscreen configured as an input and output (I/O) device. In an exemplary embodiment, the input devices of the apparatus include the respective displayed control panels of the touchscreen and one or more additional actuation devices (e.g. buttons) provided at the display border. In an exemplary embodiment, the function of the additional input devices is predetermined in a fixed manner and identified by a symbol printing on the display border.

In an exemplary embodiment, a display housing or a display holder of the display is equipped with a sensor for detection of the display inclination (e.g. the angle of inclination α). The sensor is operationally connected with a controller of the goods processing apparatus. The display is comprised of a display support and a display holder with the display housing, where the display holder is mounted on the display support so as to be pivotable. In an exemplary embodiment, the display housing includes a frame with a rear wall. The display holder is installed on the rear wall and has mechanical device configured to enable a motorized variation of the angle of inclination of the surface of the display relative to a horizontal H. In an exemplary embodiment, a motor with a mechanically coupled gearbox and with an overload protection is provided in the support part of the display. The touchscreen display can thereby be automatically pivoted by a motor. After input of a personal identification number (PIN) or of identity features of an operator of the goods processing apparatus, the display is pivoted by a motor until an angle of inclination, as predetermined depending on an operator, is reached. In an exemplary embodiment, a suitable desired value of the angle of inclination of the display, which may be different for each user, is stored in a non-volatile manner in a memory of the controller of the goods processing apparatus and/or in an external memory accessible by the controller. That has the advantage that, after an activation, the angle of inclination of the display is set automatically and in an operator-dependent manner relative to a horizontal H.

In an exemplary embodiment, the display can be pivoted by a motor via the additional actuation device(s) that are arranged at the display border. One advantage is that a small application of force can be used to operate the apparatus via the additional actuation means. An additional advantage exists in the finer gradation of the adjustment movement, and thus of an angle of inclination of an inclination angle of an inclination line situated on the surface of the display monitor, within a pivotable range relative to a horizontal in the y-direction.

In an exemplary embodiment, the angle of inclination of the display may additionally or alternatively be manually adjusted by hand. In this example, overload protection may be provided to protect the display motor with motorized adjustment against damage that might arise due to a manual pivoting of the display given a large application of force. An additional advantage exists in that a disturbing light reflection in the viewing of a screen image may be avoided (e.g. the light reflection emanates from the surface of the display) because the angle of inclination of the display may also be manually varied further within a pivotable range. In reaction to an activation of the goods processing apparatus, for example of the franking machine, the identity may be determined via personal identification information, such as a personal identification number (PIN), of the operator, and then the display screen of the display may be automatically pivoted into a defined inclination position. In an exemplary embodiment, data of this position is predetermined (e.g. recorded beforehand and stored) depending on the operator. After a deactivation of the goods processing apparatus, or of the franking machine, the display of the display assembly is automatically pivoted into an additional predetermined position.

Alternatively or additionally, in an exemplary embodiment, after a deactivation of the goods processing apparatus or of the franking machine, the display may remain in the last position into which the display has previously been pivoted.

Figure 1:
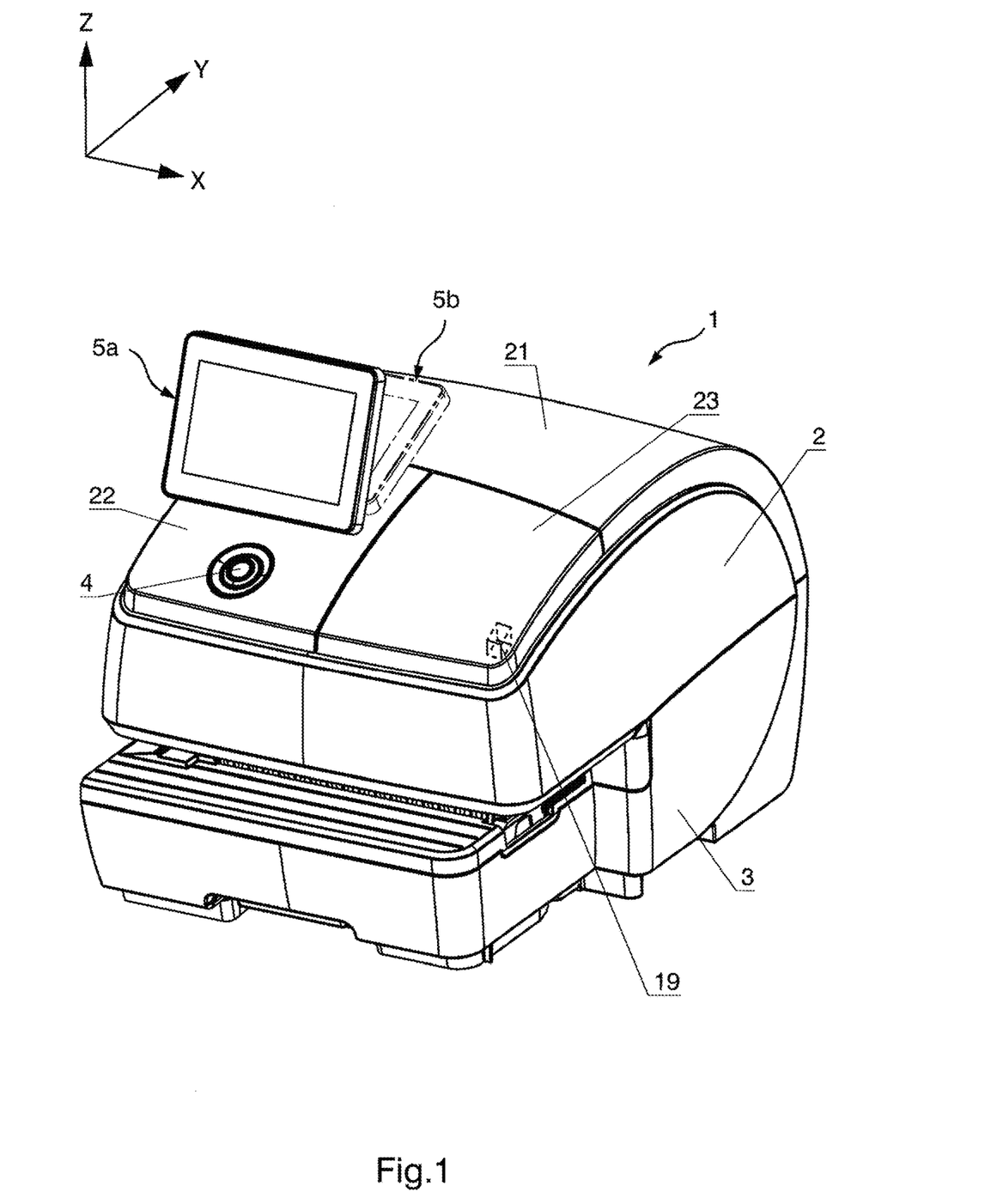
FIG. 1 is a perspective view of a franking machine with an installed display, from the upper right front, according to an exemplary embodiment of the present disclosure.

FIG. 1 shows a perspective depiction of a franking machine 1 having a mounted display, from the upper right front, according to an exemplary embodiment. A transport of print media (the manner is not shown) takes place in the transport direction x of a Cartesian coordinate system within the franking machine 1 or a printing goods processing apparatus. In an exemplary embodiment, the franking machine 1 has an upper housing shell 2 that is installed in the z-direction onto a lower housing shell 3. The upper housing shell 2 has an exchangeable cover 21 on the top side of the franking machine 1, near a rear side. In an exemplary embodiment, the cover 21 extends over the length of an upstream edge, up to a downstream edge of the surface of the franking machine. The exchangeable cover 21 has a curved, barrel-like shape and takes up approximately half of the width of the franking machine. Arranged in the other half are an exchangeable cover 22 at the front left and a housing hatch 23 at the front right. The surface of the other half of the width of the franking machine exhibits a console-shaped rise, beginning from the front side, and transitions in the y-direction into the barrel-like curved shape of the surface of the exchangeable cover 21. The exchangeable cover 22 is likewise curved on the top side, is approximately square, and takes up approximately one-quarter of the total surface of the upper housing shell 2 of the franking machine 1. The exchangeable cover 22 extends from a front side of the franking machine 1 up to half of the width of the top side of the franking machine in the y-direction, and begins upstream and ends approximately at half of the length in the middle of the franking machine 1. The exchangeable cover 22 of the franking machine 1 has a first opening in the middle of half of the length in the x-direction and in the second third of the half of the width of the top side of the franking machine in the y-direction, which opening is covered by a display of the display, wherein the display protrudes through the first opening in the z-direction (i.e. upward toward the operator). The exchangeable cover 22 moreover has a second opening in the middle of half of the length and between the first opening and an edge of the exchangeable cover 22, at the front side of the franking machine 1, through which second opening an activation switch 4 protrudes upward. A housing hatch 23 is arranged next to the exchangeable cover 22, as seen from the front right. A hatch sensor 19 (not visible) that detects an opening or closing of the housing hatch 23 is arranged below the closed housing hatch 23.

In the perspective depiction, situated to the "left" is an upstream side (not visible) of the franking machine 1 and of the display housing frame of the display. In this example, the display is drawn in a first position 5a with a maximum angle of inclination. Moreover, the display was drawn with a dash-dot line in a second position 5b, where the display has a minimum angle of inclination relative to a horizontal line. In an exemplary embodiment, the angle of inclination of the display is variable within a pivotable range, for example, from 30° to 80°, but is not limited thereto.

In an exemplary embodiment, after an activation of the franking machine 1 or of the goods processing apparatus, the display, controlled by the controller in a motorized manner, is pivoted starting from the second position 5b by a motor in the direction of the first position 5a. In an exemplary embodiment, the angle of inclination is measured by a sensor at time intervals and monitored in the controller. As a result, a predetermined angle of inclination of the display is automatically set relative to a horizontal H, where the real value of the angle of inclination corresponds to a stored desired value of the angle of inclination that is, for example, associated with the operator. Different desired angle of inclination values that are associated with a plurality of operators may be stored individually, where the inclination of the display may be corrected in a motorized manner and/or manually. In an exemplary embodiment, the desired angle of inclination may also be individually manually set by an operator via the display, using, for example, the touchscreen of the display. For this, a monitor of the touchscreen display, and/or the border of the display, contains a predetermined touchscreen input panel for motorized adjustment of the display inclination.

Figure 2:
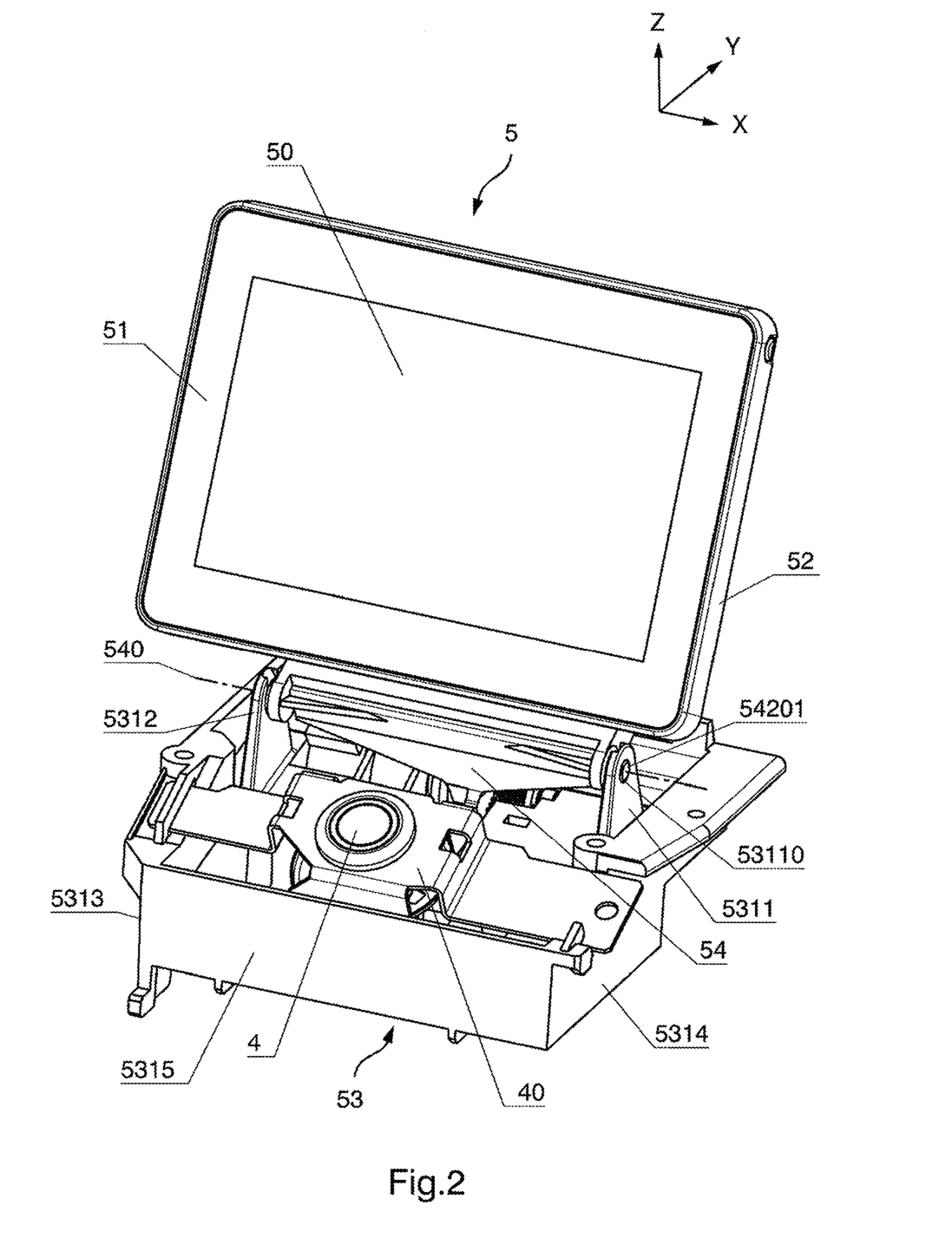
FIG. 2 is a perspective view of the display, from the upper right front, according to an exemplary embodiment of the present disclosure.

In FIG. 2, a perspective depiction of the display 5 according to an exemplary embodiment is shown from the upper right front. In an exemplary embodiment, a display holder 54 that can be pivoted around a pivot axis 540, orthogonal to the y-direction, is installed on a box-shaped display support 53. On both side walls 5313, 5314 of a frame of the display support 53 formed by sides walls 5313, 5314, 5315, 5316 (5316 not shown as being in the rear of the display support 53), and parallel to the transport direction x, a retaining plate 40 for an activation switch 4 is installed in proximity to the front side wall 5315 of the display support 53. The display has a display border 51 around a touchscreen display monitor 50, as well as a display housing frame 52, where the rear side (FIG. 3) of the display housing frame 52 is installed on the display holder 54. A retaining tab 5311 is installed downstream on the one side wall 5314 of the frame of the display support 53, and a retaining tab 5312 is installed upstream on the other side wall 5313 of the frame of the display support 53. Both retaining tabs 5311, 5312 stick out from the frame in the z-direction (upward). A bore 53110, 53120 (53120 is obstructed in the current view) is respectively incorporated into the respective projecting end of the two retaining tabs 5311, 5312. A rotation axis 540 of the display holder 54 travels through the middle of the two bores. The display holder 54 has two pivot pins 54201, 54202 (54202 is obstructed in the current view) through the middle of which the rotation axis 540 travels if the display holder 54 is installed (in the drawn manner) on the frame 5313, 5314, 5315, 5316 (5316 is obstructed in the current view) of the display support 53.

Figure 3A:
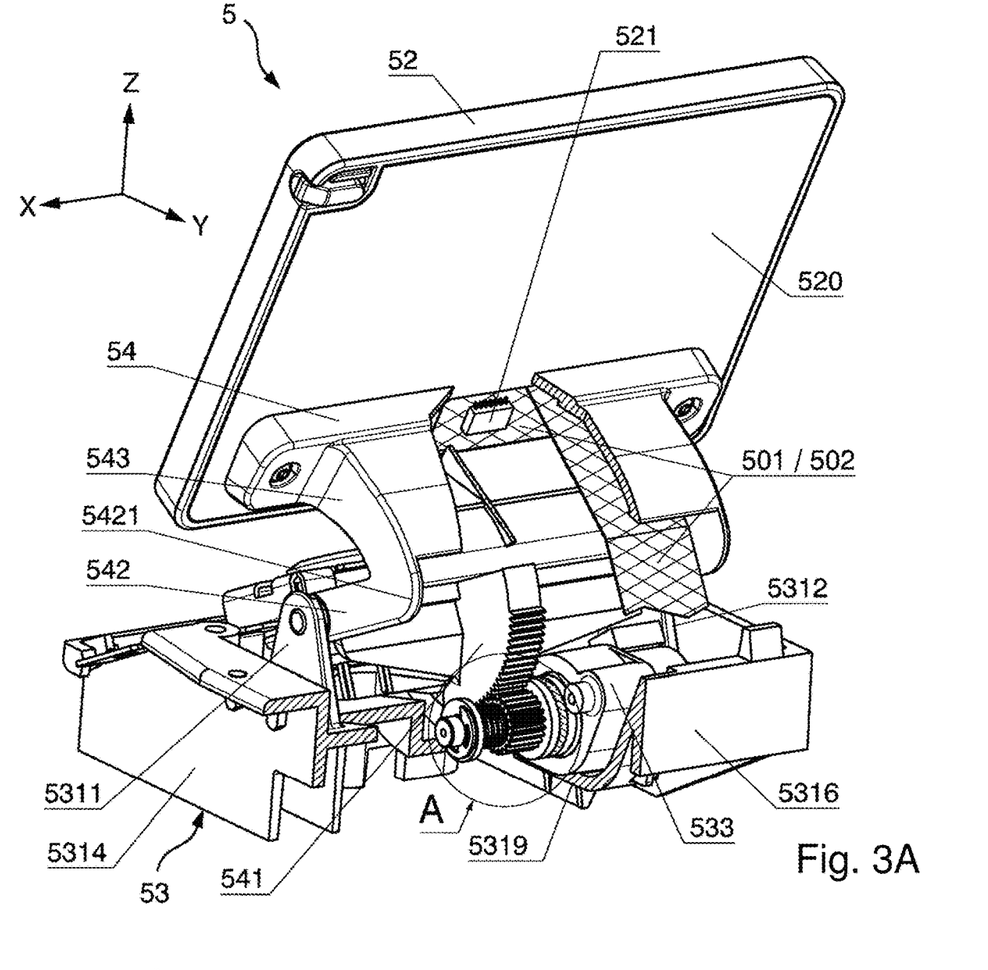
FIG. 3A is a perspective view of the sectioned display from the upper right rear, with a maximum angle of inclination of the display, according to an exemplary embodiment of the present disclosure.
Figure 3B:
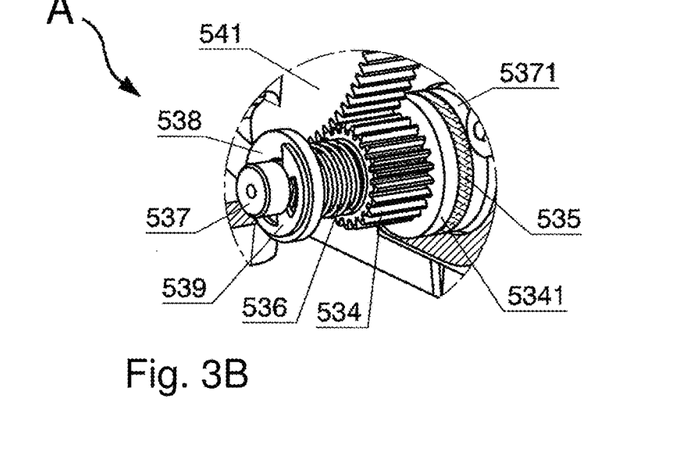
FIG. 3B is an enlarged view of portion A of the sectioned display, as shown in FIG. 3A, according to an exemplary embodiment of the present disclosure.

FIG. 3 shows a perspective depiction of the display 5 according to an exemplary embodiment from the upper right rear, with a maximum angle of inclination of the display. The display 5 has the frame 5314, 5316, 5313, 5315 (5313, 5315 are obstructed in the current view) of the display support 53 and the pivotable display holder 54 that is installed on a rear side wall 520 of the display housing frame 52. The rear side wall 5316 and the side wall 5314 of the frame of the display support 53 and the pivotable display holder 54 are drawn in partial section so that more details are visible. It is provided that the display housing 52 or the display holder 54 has a sensor 521 to determine angle of inclination. In an exemplary embodiment, the sensor 521 is installed on a flexible ribbon cable 502 (or 501) below the rear side wall of the display housing frame 52 and protrudes in the direction of the pivotable display holder 54, which also internally accommodates the flexible ribbon cables 501 and 502.

In an exemplary embodiment, the pivotable display holder 54 is formed as an angle lever, with an acute angle between a power arm 542 and a load arm 543. In an exemplary embodiment, two outer side walls at one end of a power arm 542 of the display holder 54 each have a pivot pin (FIG. 2) that is borne so as to be rotatable in lateral bores at the end of the tabs 5311, 5312 installed on the frame, and the respective other end of the power arm 542 points in the y-direction and has a stop bend 5421. In an exemplary embodiment, the pivotable display holder 54 is hollow on the inside, but is not limited thereto. Two inner side walls are provided at the respective other end of the power arm 542 and at the load arm 543, which two inner side walls bound a cavity upstream and downstream, wherein the cavity accommodates the flexible ribbon cables 501 and 502. A stop bend 5421 is designed or shaped at the at least one of the outer side walls. A partial gearwheel segment 541 that projects rearward and down is installed or molded at the respective other end of the power arm 542, in the middle of a space between the two inner side walls. The load arm 543 of the display holder 54, which load arm 543 is angled from the power arm 542, establishes a mechanical connection between the stop bend 5421 on the one hand and the display housing on the other hand. In an exemplary embodiment, a stop bend 5421 is respectively designed or shaped at the two outer side walls, where both stop bends 5421 are situated with mirror symmetry relative to the center of the space between the two inner side walls.

Alternatively or additionally, in an exemplary embodiment, a sensor 521 to detect the angle of inclination is arranged inside the load arm 543 of the display holder 54. Circular bearing pins (FIG. 2), through the circle center point of which the pivot axis travels (FIG. 2), are molded on both sides at the power arm 542 of the display holder.

Figure 6:
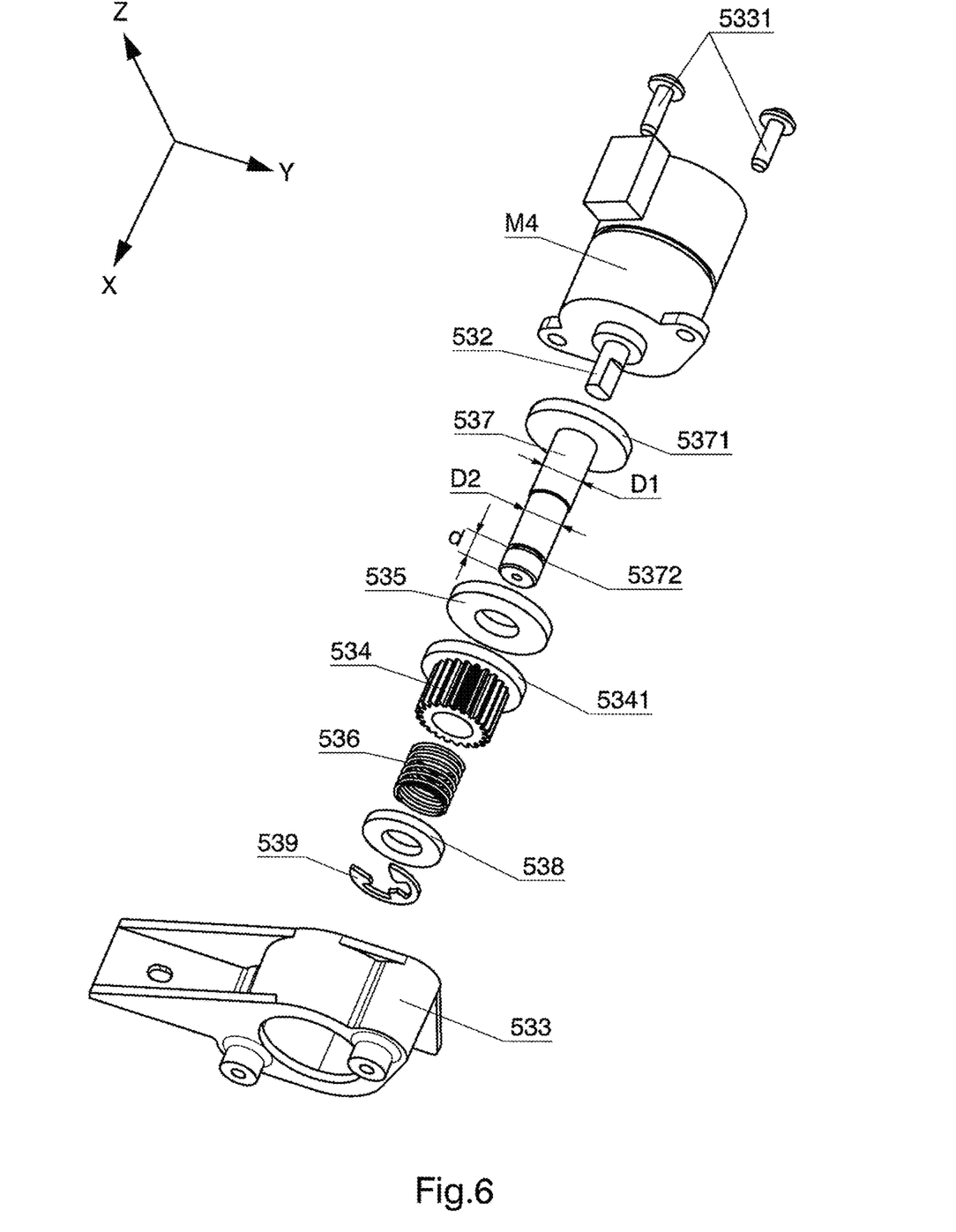
FIG. 6 is a perspective exploded view of an overload protection of the display, from the upper right rear, according to an exemplary embodiment of the present disclosure.

In an exemplary embodiment, the mechanism of the display is protected against damage by the overload protection. In this example, damage might arise due to a manual pivoting with too great an application of force. In an exemplary embodiment, the overload protection is designed as a friction or slip coupling. A motor mount 533 is installed between the rear side wall 5316 of the frame and a floor 5319 of the display support 53. The motor mount 533 holds a motor M4 (FIG. 6) with gearbox in a predetermined position so that a gear shaft 532 is aligned parallel to the transport direction x (FIG. 6). FIG. 3 shows a detail A with the slip coupling. The partial gear wheel segment 541 is engaged with a pinion 534. The pinion 534 has a collar 5341 that, via the elastic force of a compression spring 536, presses a friction disc 535 against a collar 5371 of a coupling shaft 537. The coupling shaft 537 is placed on the gear shaft 532 of the motor M4 (FIG. 6) and connected positively and non-positively with the latter. In an exemplary embodiment, the gearbox is a self-locking gearbox. In the present disclosure, the term "self-locking" refers to the gear shaft being only movable from the motor side, and the display inclination remains unchanged if the motor is not activated and no manual adjustment of the display inclination is performed.

FIG. 4 shows a side view of the sectioned display from the right side thereof according to an exemplary embodiment, with a maximum angle of inclination of the display. The rear side wall 5316 and the floor 5319 of the frame 531 of the display support 53 are drawn in section immediately before the partial gearwheel segment 541.

In an exemplary embodiment, a stop lug 5411 is arranged projecting from the partial gearwheel segment 541 and strikes a second stop contour 5318 of the display support that is molded on the floor 5319 of the frame 531 and projects in the z-direction. The display holder 54 has the display monitor 50 rotated into an extreme position so that an inclination line N that is placed on a surface of the display housing frame 52 that is directed forward, or on the surface of the display monitor 50, is brought into a maximum angle of inclination $\alpha_{max}$ relative to a horizontal H that intersects a rotation point of the pivot axis 540 of the display holder 54 and extends parallel to the y-direction.

Figure 5:
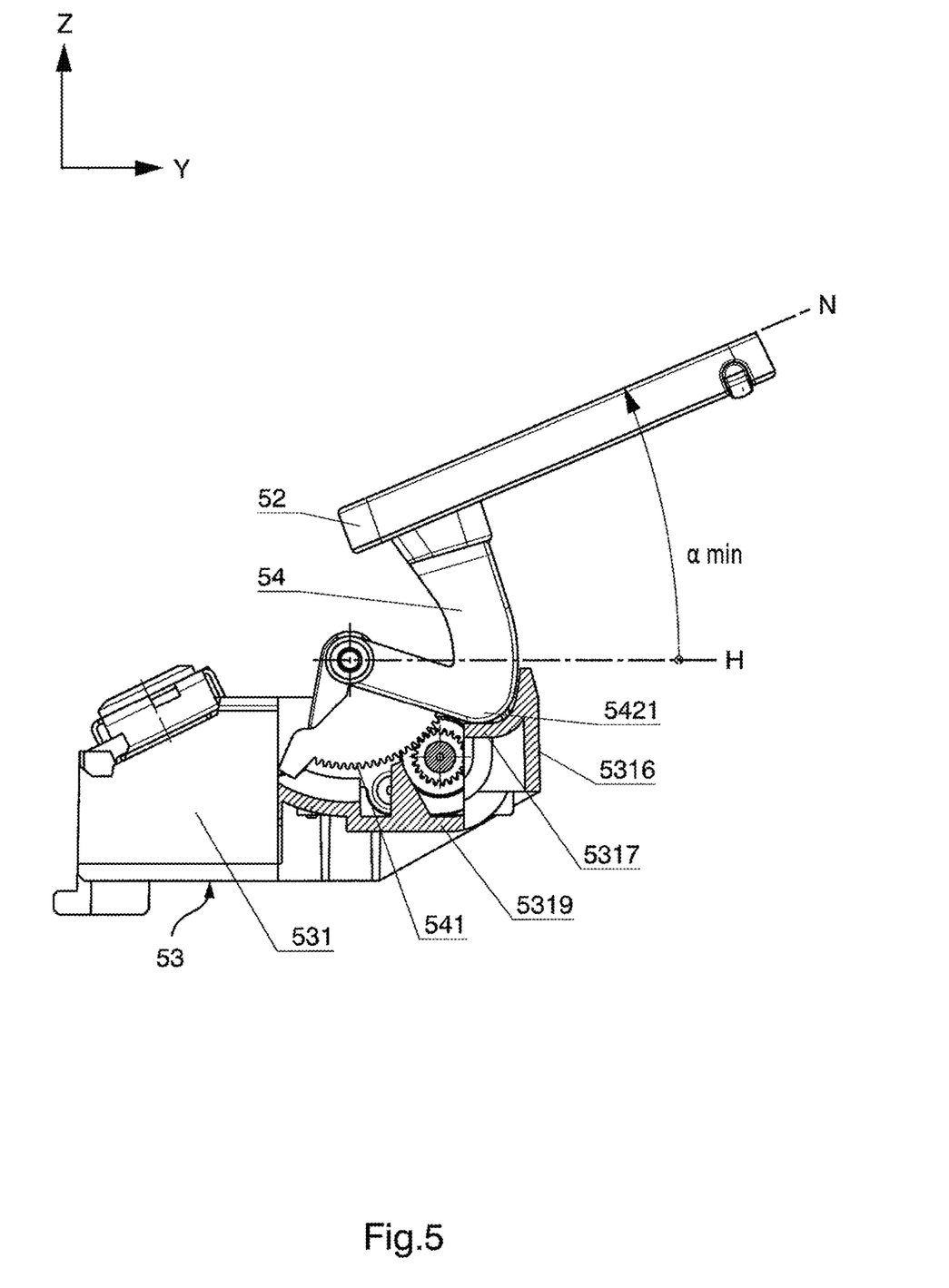
FIG. 5 is a side view of a sectioned display from the right, with a minimum angle of inclination of the display, according to an exemplary embodiment of the present disclosure.

FIG. 5 is a side view of a sectioned display from the right side thereof according to an exemplary embodiment, with a minimum angle of inclination of the display. The rear side wall 5316 and the floor 5319 of the frame 531 of the display support 53 are drawn in section immediately before the partial gearwheel segment 541.

According to FIG. 5, the display housing frame 52 is shown pivoted so far that the stop bend 5421 of the display holder contacts a first stop contour 5317 at the rear side wall 5316 of the frame 531 of the display support. In this position, the inclination line N of the surface of the display monitor 50 is situated at a minimum angle of inclination $\alpha_{min}$ relative to a horizontal H that intersects the rotation point of the pivot axis 540 (FIG. 2) of the display holder 54 and extends parallel to the y-direction.

FIG. 6 shows a perspective and exploded view (from the upper right rear) of an overload protection of the display according to an exemplary embodiment. In an exemplary embodiment, the overload protection is designed as a single-disc slip coupling 534, 535, 536, 537, 538, 539. A motor M4 has a gearbox and may be attached by screws 5331 (or other fasteners) to the motor mount 533. The coupling shaft 537 has a socket at one end and may be placed by means of this onto the gear shaft 532 of the motor M4 and be positively and non-positively connected. The coupling shaft 537 has a collar 5371 that is formed around the socket, wherein the socket is aligned toward the motor M4. The coupling shaft 537 is cylindrical in shape and graded at a location directed away from the motor M4. In a first segment before the grade, the diameter D1 of the coupling shaft 537 is greater than the diameter D2 in a second segment that begins after the grade in the transport direction x. The coupling shaft 537 has a plunge cut 5372 at a small distance d from the other end directed away from the motor M4. A central bore of the pinion 534 is adapted to the diameter D1.

In an exemplary embodiment, the compression spring 536 is installed at the second segment of the coupling shaft 537 so that, due to the elastic force of the compression spring 536, the compression spring 536 presses on a face end of the pinion 534, a collar 5341 of the pinion 534 being situated opposite the face end. This cause the friction disc 535 to be pressed on the collar 5371 of the coupling shaft 537, and so that the coupling shaft 537 has a plunge cut 5372 for an installation of the securing disc 539.

In an exemplary embodiment, the plunge cut 5372 at the coupling shaft 537 is provided for an installation of the securing disc 539. A washer 538 may be installed on the coupling shaft 537, between the securing disc 539 and the compression spring 536.

Figure 7:
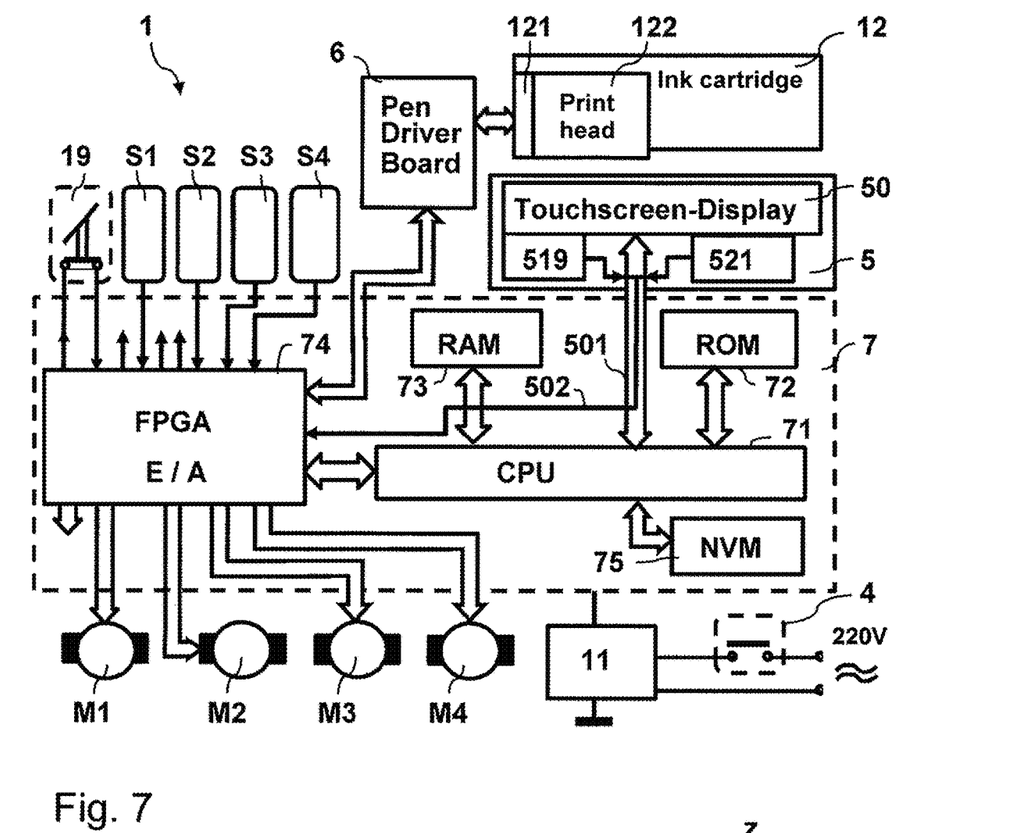
FIG. 7 is a block diagram of a controller according to an exemplary embodiment of the present disclosure.

FIG. 7 shows a simplified block diagram of a controller 7 according to an exemplary embodiment of the present disclosure. In an exemplary embodiment, the controller 7 includes a central processing unit (CPU) 71, a program memory (ROM) 72, a working memory (RAM) 73, an input/output circuit 74, and a non-volatile memory (NVM) 5, which are likewise operationally connected with the CPU 71. In an exemplary embodiment, the input/output circuit 74 is a Field Programmable Gate Array (FPGA) that is operationally connected with a circuit closer 4, sensors S1 to S4, a number of motors M1 to M4, and—via a pen driver board 6—with an inkjet print head of the goods processing apparatus. In an exemplary embodiment, the sensor 521 is configured to detect data (e.g. angle inclination information) and output the detected data via a flexible ribbon cable 501 to pass the detected data to the controller 7. The sensor 521 is electrically connected with the input/output circuit 74 of the controller 7 via the flexible ribbon cable 501. To output digital image data, the controller 7 is electrically connected via a flexible ribbon cable 502 with the display monitor 50, which displays the digital image data. The CPU 71 of the controller is electrically connected via the input/output circuit 74 with the sensor 521 in order to be able to determine the set angle of inclination of the display, and in order to subsequently electronically select the desired angle of inclination via a motor. In an exemplary embodiment, the sensor 521 is, for example, an acceleration sensor, such as an ultra-low power, high performance 3-axis "nano" accelerometer. Miniaturized sensors are most often assembled with piezoelectric sensors or as a MEMS (Micro-Electromechanical System). The MEMS are produced from silicon and are spring-mass systems in which the "springs" are silicon webs only a few µm in width, and the mass is also produced from silicon. Via the deflection upon acceleration, a change in the electrical capacitance may be measured between the elastically suspended part and a fixed reference electrode. The total measurement range corresponds to a capacitance change of approximately 1 pF. The electronic unit for evaluation of this small capacitance change is accommodated in the same integrated circuit (IC). In an exemplary embodiment, the sensor 521 is a LIS3DH-type acceleration sensor. The LIS3DH is an ultra-low power, high performance 3-axis linear acceleration sensor with digital I2C/SPI interface. The sensor 521 gas energy-saving operating modes that enable extended power saving functions, and intelligent integrated functions. In an exemplary embodiment, the miniaturized sensor is designed as a MEMS (Micro-Electromechanical System) and is installed on the flexible ribbon cable 501, and is electrically connected with selected conductors of the flexible ribbon cable 501. The sensor, together with the touchscreen display and the flexible ribbon cables 501, 502, is installed in the display housing and is electrically connected with the input/output circuit 74 of the controller 7 via the flexible ribbon cable 501. The touchscreen display is electrically connected with the CPU 71 of the controller 7 via a flexible ribbon cable 502.

In an exemplary embodiment, the value measured by the acceleration sensor, associated with each adjustment state of the inclination of the display, corresponds to the angle of inclination α. It is compared by the CPU 71 of the controller 7 with a nominal value at time intervals, stored in a non-volatile manner in the non-volatile memory NVM 75 of the controller 7 of the goods processing apparatus. In this example, the nominal value corresponds to the desired angle of inclination in order to accordingly control the motor M4. For example, a direct current motor or a stepper motor may be used as a motor. The touchscreen display monitor 50 indicates arbitrary symbols in the visible region of the display after the activation of the franking machine. These visualized symbols may be functionally activated via a direct or indirect contact. A fixed region with permanent symbols may be pre-allocated between the display housing frame and the region of the display that can be visualized, thus in the border region of the display. Such symbols are provided for functions that must be activatable often, frequently, or always, thus from every monitor display mode. For a resistive or capacitive display, such regions may be activated by expanding the touch region of the touch film situated on the display monitor, without an active display area being realized under the display border 51 (FIG. 2).

The advantage is an always-present possibility of storing a specific function (return address, home menu, brightness control, audio volume control, movement of the display etc.) and achieve this regarding of the screen/mode. This may be actively assisted via a symbol printing on the glass substrate of the display border 51, or be executed as a hidden button.

In an exemplary embodiment, as an alternative to an acceleration sensor (accelerometer), a piezoelectric acceleration sensor, a rotary encoder, an angle sensor with Hall element, a position sensor, a tilt sensor, or an inclination sensor may likewise be used.

In an exemplary embodiment, a fingerprint sensor is provided as an input device for inputting identity features. The fingerprint sensor may be integrated into the touch region of the touchscreen display, but is not limited thereto.

Figure 8:
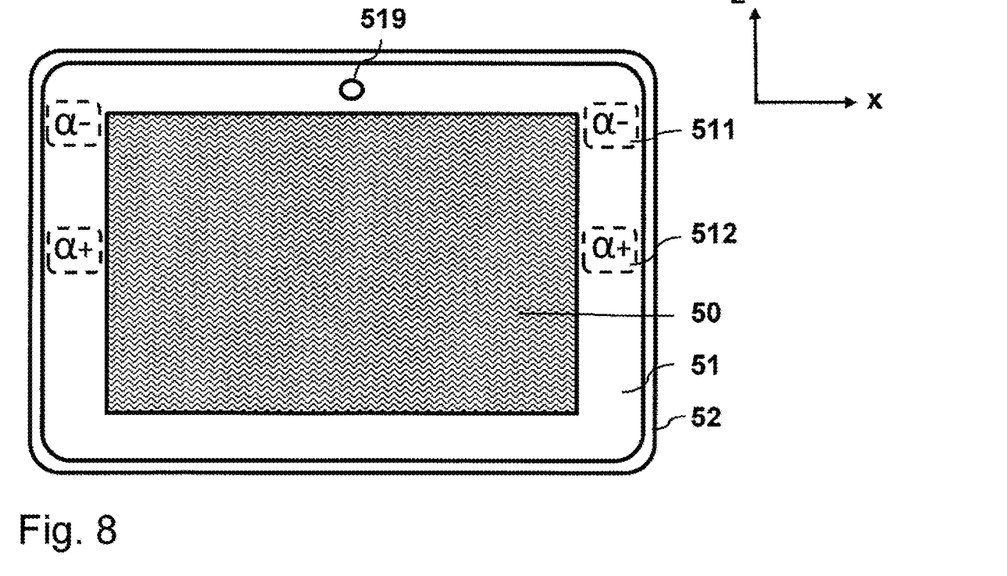
FIG. 8 illustrates a display with additional actuation devices according to an exemplary embodiment of the present disclosure.

FIG. 8 illustrates a touchscreen display according to an exemplary embodiment with additional actuation devices (e.g. buttons) 511 and 512 at the right and left side of the display border 51, and an additional sensor 519 at an upper segment of the display border 51. The display border 51 is overlaid with a touch-sensitive film (touch film) and framed by the display housing 52.

Figure 9:
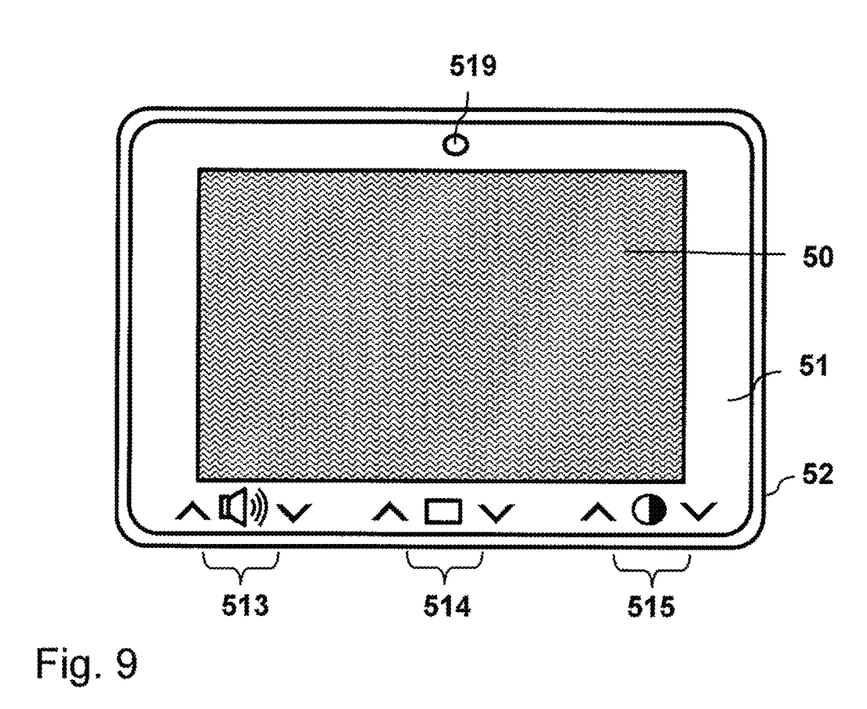
FIG. 9 illustrates a display with additional actuation devices according to an exemplary embodiment of the present disclosure.

FIG. 9 illustrates a display (e.g. touchscreen display) according to an exemplary embodiment with additional actuation devices (e.g. buttons) 513, 514, and 515 at a lower segment of the display border 51. The audio volume of a reproduction source may be adapted to the requirements of the operator with the additional actuation device 515. With the additional actuation device 514, the inclination of the display may be adapted to the viewing angle of the display monitor 50 as desired by an operator.

The smart franking machine is further improved in its operation with the additional actuation device 515 and an additional light sensor 519, where both are arranged at the display border. The brightness of the display may be varied with the additional actuation device 515. That is also advantageous because light reflections may be outshone with this, and in fact independently of the screen image that is respectively displayed by the display. The light sensor technology allows an automatic adaptation of the luminous intensity of the display to the ambient luminous intensity within a solid angle $\Omega$.

In an exemplary embodiment, alternatively or additionally, the actuation devices may be arranged (the manner is not shown) in an upper segment of the display border 51, or in selected or all segments of the display border 51. The additional actuation devices 511-515 are produced at the display border 51 in that a touch film is placed on the display border 51.

In an exemplary embodiment, a smart franking machine may be equipped with an acoustic device and a speech assistant to further improve the operation of the franking machine via a speech control, in that the optimal angle of inclination of the display is set specific to the user via speech control.

The disclosure is not limited to the embodiment presently explained in detail, since additional other embodiments of the disclosure may obviously be developed or used that—based on the same fundamental ideas of the disclosure—are encompassed by the appended patent claims.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, other structural electronic hardware, or a combination thereof. A processor includes a microprocessor, a digital signal processor (DSP), central processing unit (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

A detail with the slip coupling,
D1, D2 diameter of the coupling shaft 537,
d small distance of the plunge cut from the end of the coupling shaft 537,
H horizontal,
N inclination line,
M1, M2, M3, M4 motors,
S1, S2, S3, S4 sensors,
x transport direction, x-coordinate,
y transversal displacement direction, y-coordinate,
z z-coordinate of a Cartesian coordinate system,
$\alpha_{max}$, $\alpha_{min}$ angle of inclination,
1 franking machine,
11 mains adapter (alternating current/direct current converter)
19 switch at the housing hatch,
2 upper housing shell, 21 cover at the upper housing shell, rear,
22 cover at the upper housing shell, front,
23 housing hatch,
3 lower housing shell,
4 activation button,
40 retention plate for activation button,
5 display,
5a display position at maximum angle of inclination,
5b display position at minimum angle of inclination,
50 touchscreen display monitor,
501 flexible ribbon cable,
502 flexible ribbon cable,
51 display border,
511-515 additional actuation means on the display border,
519 light sensor at the display border,
52 display housing frame,
520 rear side wall of the display housing frame,
521 sensor for detecting angle of inclination,
53 display support,
531 frame of the display support,
5311 retaining tab, downstream,
5312 retaining tab, upstream,
53110, 53120 bores in the retaining tabs,
5313, 5314 sides of the frame for the pivotable display holder 54,
5315 front side wall of the frame of the display support,
5316 rear side wall of the frame of the display support,
5317 1st stop contour at the display support,
5318 2nd stop contour at the display support,
5319 floor of the display support,
531 frame of the display support,
532 gear shaft,
533 motor mount,
5331 screws,
534 pinion,
5341 collar of the pinion 534,
535 friction disc,
536 compression spring,
537 coupling shaft,
5371 collar of the coupling shaft 537,
5372 plunge cut of the coupling shaft 537 for securing disc,
538 washer,
539 securing disc,
54 pivotable display holder,
540 pivot axis,
541 partial gearwheel segment,
5411 stop lug,
542 power arm of the display holder,
54201, 54202 bearing pins,
5421 stop bend of the display holder,
6 pen driver board,
7 controller,
71 processor (Central processing Unit-CPU),
72 program memory (ROM),
73 working memory (RAM),
74 input/output circuit (FPGA)
75 non-volatile memory (NVM),
12 ink cartridge,
121 contact field of the inkjet print head,
122 inkjet print head

The invention claimed is:

1. A goods processing apparatus, comprising:
a pivotable display including a display support, a pivotable display holder, a display housing that houses a display monitor having a display border arranged around the display monitor and a display housing frame that surrounds the display border, and at least one actuation input device configured to manually trigger a motorized pivoting of the display monitor;
a sensor configured to detect an angle of inclination of the pivotable display; and
a controller configured to control a motor to automatically set a display inclination of the pivotable display based on the detected angle of inclination and a respective operator of the apparatus, the motor being configured to pivot the pivotable display comprises a self-locking gearbox configured to reduce a rotation of the motor and an output via a gear shaft to an overload protection, wherein:
the overload protection is a single-disc slip coupling comprising a pinion, a friction disc, a compression spring, a coupling shaft, a washer, and a securing disc; and
the compression spring is installed on a second segment of the coupling shaft so that, due to an elastic force of the compression spring, the compression spring presses on a face end of the pinion, and thereby a collar of the pinion situated opposite the face end of the pinion causes the friction disc to be pressed on a collar of the coupling shaft, and wherein the coupling shaft includes a plunge cut configured for an installation of the securing disc.

2. The goods processing apparatus according to claim 1, wherein the sensor is disposed on a rear wall of the display housing frame or included in or on the display holder.

3. The goods processing apparatus according to claim 1, wherein the pinion of the overload protection is configured to engage with a partial gearwheel segment of the pivotable display holder.

4. The goods processing apparatus according to claim 3, wherein the overload protection is a multi-disc slip coupling.

5. The goods processing apparatus according to claim 1, wherein the sensor is electrically connected to the controller via an input/output circuit of the controller to input detected data into the controller, and the controller is electrically connected with the display monitor to output digital image data via a flexible ribbon cable.

6. The goods processing apparatus according to claim 5, wherein the detected data of the sensor corresponds to the angle of inclination of the pivotable display.

7. The goods processing apparatus according to claim 1, wherein the display border includes the at least one actuation input device of the display, the sensor, and a light sensor.

8. The goods processing apparatus according to claim 7, wherein the at least one actuation input device comprises a touch film.

9. The goods processing apparatus according to claim 1, wherein the motor is a stepper motor.

10. The goods processing apparatus according to claim 1, wherein the angle of inclination is defined between a surface of the display monitor and a horizontal plane.

11. The goods processing apparatus according to claim 1, wherein the controller comprises a processor, a program memory, a working memory, an input/output circuit, and a non-volatile memory that stores setting data, the program memory including a program stored therein that controls the motor to automatically set the display inclination of the pivotable display based on the detected angle of inclination and a respective operator of the apparatus.

12. The goods processing apparatus according to claim 11, wherein the sensor and the motor are electrically connected with the controller via the input/output circuit.

* * * * *